(12) United States Patent
Lee

(10) Patent No.: US 6,539,225 B1
(45) Date of Patent: Mar. 25, 2003

(54) SEAMLESS DATA NETWORK TELECOMMUNICATION SERVICE DURING MOBILE WIRELESS CALL HANDOFF

(75) Inventor: Chinmei Chen Lee, Woodbridge, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/337,296

(22) Filed: Jun. 21, 1999

(51) Int. Cl.[7] .................................................. H04Q 7/20
(52) U.S. Cl. ........................ 455/436; 455/442; 455/445; 370/331
(58) Field of Search ................................. 455/442, 436, 455/437, 438, 439, 440, 441, 432, 445; 370/331, 332, 438

(56) References Cited

U.S. PATENT DOCUMENTS

| 4,901,340 A | * | 2/1990 | Parker ........................ 455/432 |
| 5,195,090 A | * | 3/1993 | Bolliger et al. .............. 455/436 |
| 5,267,261 A | * | 11/1993 | Blakeney .................... 370/332 |
| 5,850,607 A | * | 12/1998 | Muszynski .................. 455/442 |
| 6,160,804 A | * | 12/2000 | Ahmed et al. .............. 370/349 |

OTHER PUBLICATIONS

W. Woo and V. C. M. Leung, "Handoff Enhancement in Mobile–IP Environment", 5th IEEE International Conference on Universa Personal Communications, vol. 2, pp. 760–764, Oct. 1996.*
C. E. Perkins, "Mobile IP", IEEE Communications Magazine, pp. 84–89, May 1997.*

* cited by examiner

*Primary Examiner*—Vivian Chin
*Assistant Examiner*—James Moore
(74) *Attorney, Agent, or Firm*—Walter W. Duft

(57) ABSTRACT

A system and method provide seamless data network telecommunication service to a mobile wireless node during mobile wireless call handoff from a first base station to a second base station. Prior to call handoff, communication content addressed to the mobile wireless node is routed to a first address for delivery to the mobile wireless node via the first base station. Upon initiation of the call handoff, the communication content is routed to a second address for delivery to the mobile wireless node via the second base station. At the same time, routing of the same communication content is continued to the first address. Upon completion of the call handoff, communication content routing to the first address is terminated.

15 Claims, 3 Drawing Sheets

SEAMLESS DATA NETWORK TELECOMMUNICATION SERVICE DURING MOBILE WIRELESS CALL HANDOFF

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to the implementation of telecommunication service in a data network on behalf of mobile wireless nodes. More particularly, the invention pertains to a system and method for routing data network communication content to mobile wireless nodes that are undergoing call hand off from one radio base station to another.

2. Description of the Prior Art

Considerable attention has been directed toward the implementation of mobile telecommunication service in computer data networks, and particularly the ability to route communication content to mobile wireless nodes that routinely connect to the data network at different points of attachment, via air interfaces. These include cellular telephones, Personal Digital Assistants (PDAs), laptop computers, and other mobile wireless communication equipment.

To facilitate mobile wireless telecommunication service in a data network, it is desirable (although not always possible) to allow mobile wireless nodes to change their link-layer point of network attachment without reassigning a new network address. According to current data network telecommunication standards for mobile equipment in general (e.g., the "Mobile IP" standards promulgated by the Internet Engineering Task Force (IETF) or the General Packet Radio Service (GPRS) standards proposed by the European Telecommunication Standards Institute (ETSI)), one way to provide the desired network address transparency is to employ "mobility agents." These are network routing nodes that route communication content on behalf of mobile nodes as they move around the network. For example, according to the IETF Mobile IP standards, a mobile node's mobility agents may consist of a "home agent" routing node and may also include a "foreign agent" routing node. The home agent is a routing node in the mobile node's subnetwork that maintains a network interface on the link indicated by the mobile node's "home address," which is a network address intended to remain assigned to the mobile node for an extended time period. When the mobile node is away from its home subnetwork, the home agent intercepts communication content bound for the mobile node's home address and tunnels it for delivery to a "care-of" address assigned to the mobile node when the mobile node registers on a foreign subnetwork. The care-of address may be the address of a foreign agent routing node in the foreign subnetwork.

Correspondent nodes wishing to communicate with a foreign-registered mobile node are able to address their communication content to the mobile node's home address. Transparently, the communication content is tunneled to the mobile node's care-of address and delivered to the mobile node on the foreign subnetwork. Normal routing is used for sending return communication content from the mobile node to the correspondent node.

The foregoing routing mechanism can be used for mobile wireless nodes connected to a foreign subnetwork via an air interface. However, a problem may arise if the mobile wireless node is being actively transported while communicating over the data network, and a call handoff is required from one radio base station to another. In that case, the old base station may be linked to one care-of address, while the new base station is linked to another care-of address. Call handoff then requires that the communication tunneling endpoint be transferred from the old care-of address to the new care-of address.

This may create gaps that interrupt the timely delivery of call content, which can degrade communication quality, particularly for voice telephony. Such gaps arise from the inability of the data network to coordinate well with the air interface so as to determine the exact time of handoff. Delay can occur between the point of handoff and the point at which the home agent begins routing communication content to the new care-of address.

Accordingly, there is a need in a data network telecommunication system serving mobile wireless nodes for improved call handoff without loss of communication content. What is required is a system and method that seamlessly routes communication content during handoff so that the mobile wireless node does not experience noticeable communication content loss other than that caused by the air interface, if any.

SUMMARY OF THE INVENTION

A system and method in accordance with the invention provides seamless data network telecommunication service to a mobile wireless node during mobile wireless call handoff from a first radio base station to a second radio base station. Prior to call handoff, communication content addressed to the mobile wireless node is routed on behalf of the mobile wireless node to a first address for delivery to the mobile wireless node via the first base station. Upon initiation of the call handoff, the communication content is routed to a second address for delivery to the mobile wireless node via the second base station. At the same time, routing of the same communication content to the first address is continued. Upon completion of the call handoff, communication content routing to the first address is terminated.

In preferred aspects of the invention, it is contemplated that routing to the first and second addresses will be performed by a network routing node that acts on behalf of the mobile wireless node. If the invention is incorporated in a mobile networking environment as envisioned by the IETF Mobile IP standards, it is contemplated that the routing node will be implemented as a "home agent" that is located on the mobile wireless node's home subnetwork, and which is configured to route communication content to designated care-of addresses as the mobile wireless node moves between cells served by the first and second base stations. In the IETF Mobile IP embodiment of the invention, it is contemplated that the care-of addresses will correspond to "foreign agents" that are linked to, or reside at, the first and second base stations.

Finally, it will be understood that the mobile wireless node may communicate with correspondent nodes located in a data network, such as a LAN or WAN, or an internetwork, such as the public Internet, or communicate with telecommunication equipment connected to a voice network, such as the PSTN. The term "data network" as used herein is not intended to be limited in any way and should be understood as broadly including any system that allows data communication to occur by and between one or more data communication resources linked by one or more communication pathways.

BRIEF DESCRIPTION OF THE DRAWING

The foregoing and other features and advantages of the invention will be apparent from the following more particular description of a preferred embodiment of the invention, as illustrated in the accompanying Drawing, in which.

DETAILED DESCRIPTION OF THE PREFERRED EMBODIMENT

Figure 1:
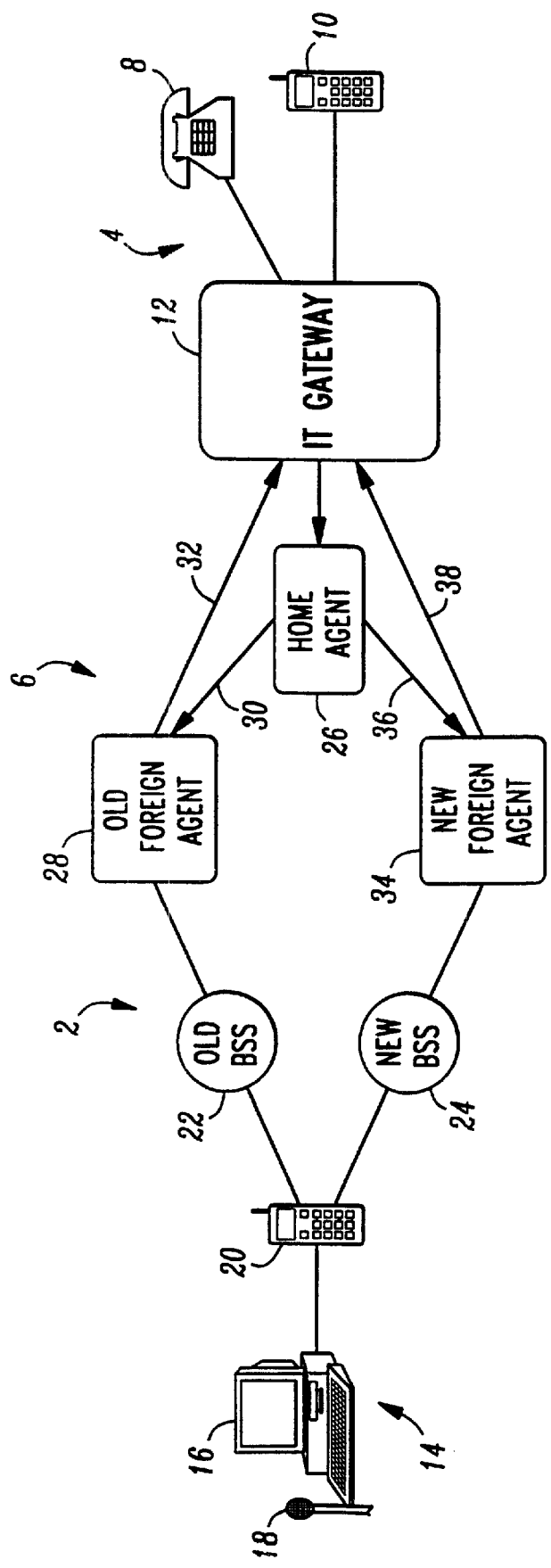
FIG. 1 is a block diagram showing a first embodiment of an exemplary data network telecommunication system for routing communication content between a correspondent node in a voice network and a mobile wireless node in the data network, as the mobile wireless node undergoes handoff from one radio base station to another.
Figure 2:
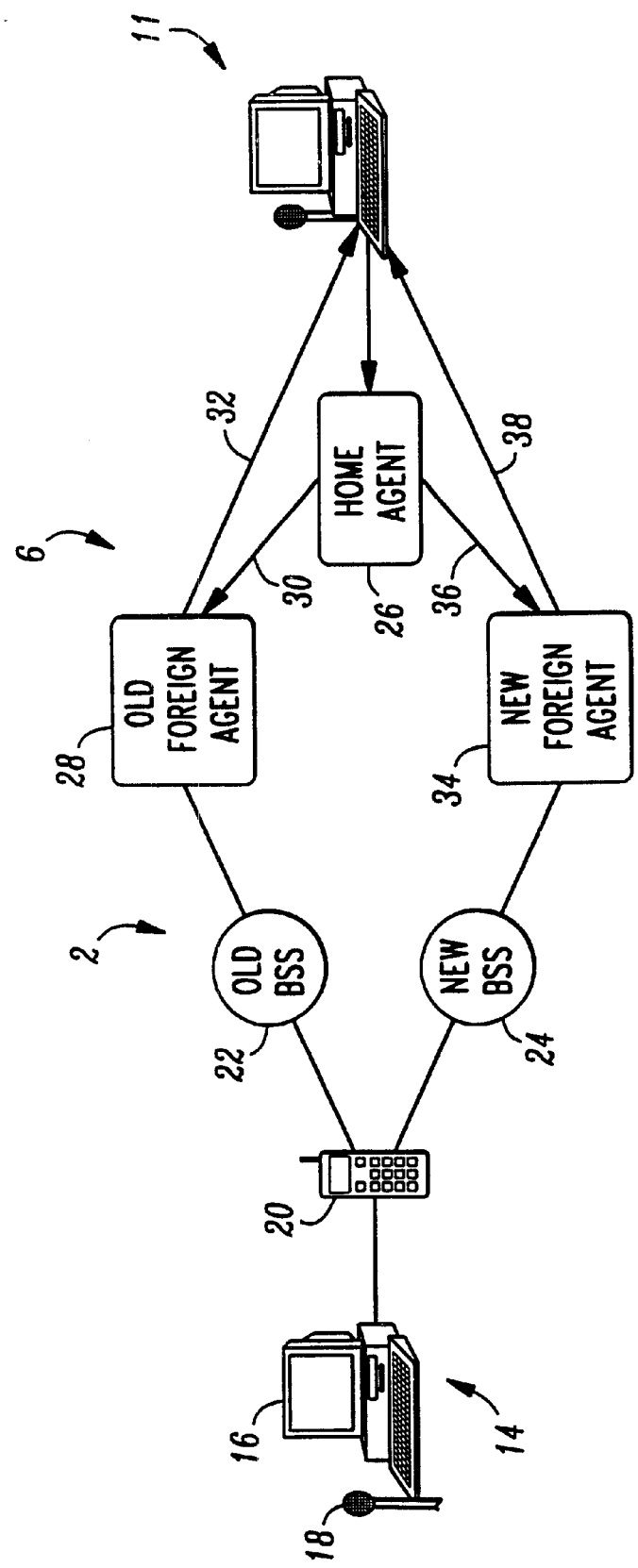
FIG. 2 is a block diagram showing a second embodiment of an exemplary data network telecommunication system for routing communication content between a correspondent node in a data network and a mobile wireless node therein, as the mobile wireless node undergoes handoff from one radio base station to another.

Turning now to the figures, wherein like reference numerals represent like elements in all of the several views, FIGS. 1 and 2 illustrate an exemplary telecommunication system 2 for routing communication content, e.g., voice telephony content, video content, data content, etc., between a mobile wireless node and a correspondent network node. In FIG. 1, the correspondent node is located in a voice network 4, such as the PSTN, and the mobile wireless node is located in a data network 6, such as the Internet. Two exemplary correspondent nodes in the voice network 4 are shown by way of example only, as wireline subscriber equipment 8 (e.g., a telephone) and wireless subscriber equipment 10 (e.g., a cellular telephone, a PDA, etc.). In FIG. 2, the correspondent node and the mobile wireless node are both located in the data network 6. The correspondent node could be implemented, by way of example only, as a computer 11.

In FIG. 1, a PSTN/data network gateway 12 routes communication content from the correspondent nodes 8 and 10 to the data network 6. With the exception of the programming modifications described below, the gateway 12 is conventional in nature and could be implemented, by way of example only, using the PacketStar™ Gateway 1000 product from Lucent Technologies Inc.

In both of FIGS. 1 and 2, the data network 6 includes a mobile wireless node 14. The mobile wireless node 14 could be a cellular telephone or PDA device. It could also be implemented as a portable (e.g., laptop) computer 16 having a voice interface 18 and a radio transceiver 20. As is conventional, the mobile wireless node 14 communicates via an air interface to fixed radio base stations. Two such base stations are shown in FIG. 1 by reference numerals 22 and 24. The mobile node 14 could communicate with the base stations 22 and 24 via analog signaling, or one of the digital transmission standards such as Time Division Multiple Access (TDMA) or Code Division Multiple Access (CDMA).

Although not shown, each base station 22 and 24 is located to serve a defined geographic area that is commonly known as a cell. Each cell forms part of a cluster of similarly configured cells that are located so as to be "contiguous" to other such cells, albeit with some overlapping of base station signal coverage. As is well known in the art, this contiguous cell arrangement allows mobile wireless nodes to maintain communication with the data network 6 as they pass from cell to cell. This process, known as "call handoff," results in a mobile wireless node terminating communication with the base station of the cell that the mobile wireless node is leaving, and initiating communication with the base station of the cell that the mobile node is entering.

Without intending to limit the scope of the invention, it is contemplated that the telecommunication system and method disclosed herein will in most cases be incorporated in a data network that implements the Mobile IP standards promulgated by the IETF, the GPRS standards proposed by the ETSI, or some variant of one of these standards. In that case, a home agent 26 will be assigned to the mobile wireless node 14. As described by way of the Background set forth above, the home agent 26 is a router located in the mobile wireless node's home subnetwork that allows correspondent nodes, such as the nodes 8, 10 and 11, to communicate with the mobile wireless node 14 using the latter's home address. It does this by maintaining a network interface on the network link indicated by the mobile wireless node's home address. As also described in the Background set forth above, when the mobile wireless node 14 is registered on a foreign subnetwork, communication content from correspondent nodes is tunneled to an assigned care-of address, which would be the address of a foreign agent.

Figure 3:
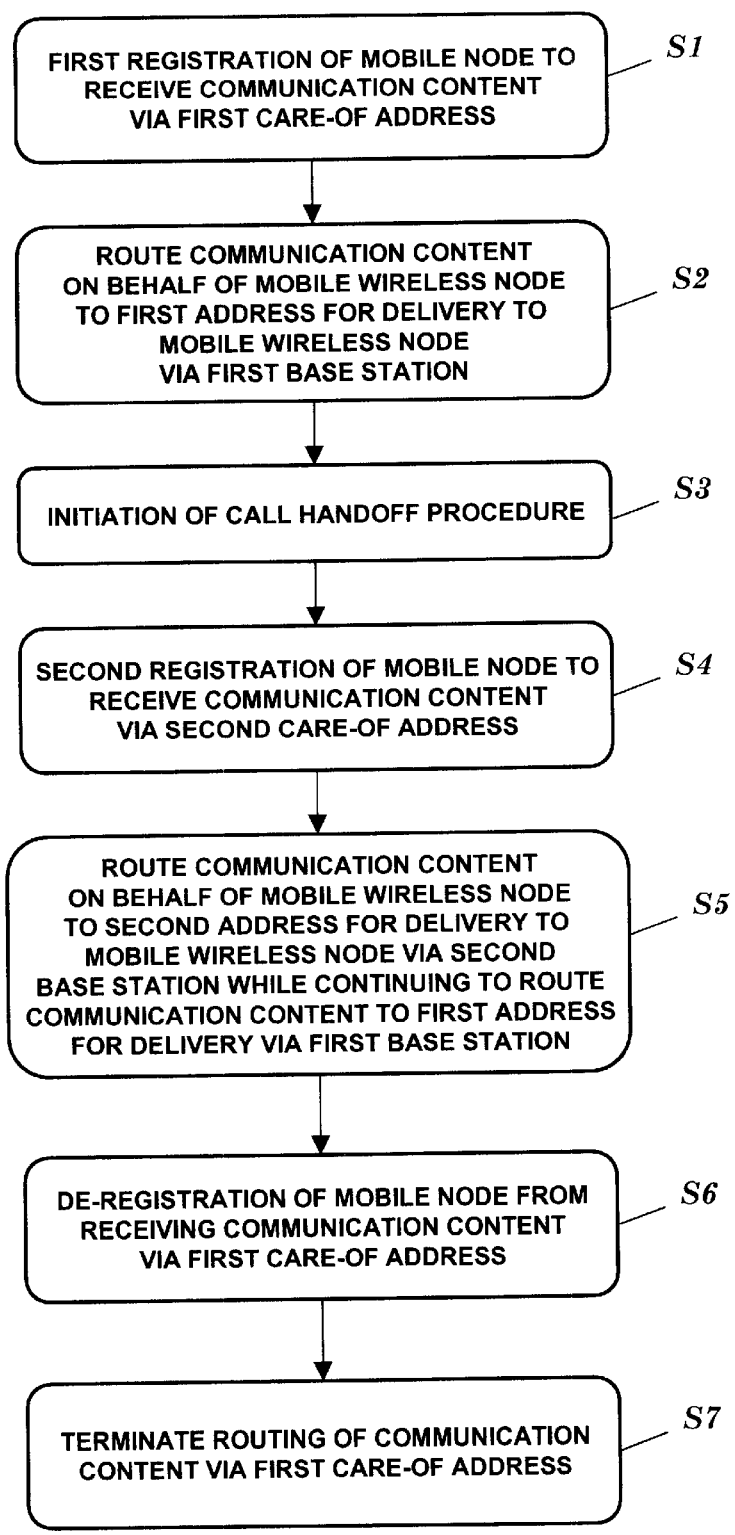
FIG. 3 is a flow diagram showing communication content routing in accordance with the invention.

In FIGS. 1 and 2, and with additional now to FIG. 3, it is assumed that the mobile wireless node initially communicates through an air interface to the base station 22, which is identified as the "Old BSS" (Old Base Station System). As is conventional, when the mobile wireless node 14 first establishes communication with the Old BSS 22, it undergoes an initial registration procedure whereby a care-of address is assigned and reported to the home agent 26. This is shown by step S1 in FIG. 3. This initial registration procedure could be initiated by either the mobile wireless node 14 or the Old BSS 22. In the exemplary case illustrated herein, the care-of address is that of a foreign agent 28, which is identified in FIGS. 1 and 2 as the "Old Foreign Agent." The Old Foreign Agent 28 is preferably a router in the data network that maintains a link layer connection to the Old BSS 22. The Old Foreign Agent 28 can be physically placed at any suitable location. For example, it could be implemented as part of Old BSS 22 itself. The home agent 26 implements the initial registration by binding the home address of the mobile wireless node 14 with the care-of address of the Old Foreign Agent 28 in a process known as mobility binding. This allows the home agent 26 to intercept communication content addressed to the mobile wireless node's home address and tunnel it to the Old Foreign Agent 28.

During the time period that the mobile wireless node 14 is communicating with the Old BSS 22, communication content from correspondent nodes, such as the nodes 8, 10 and 11, is routed (via the gateway 12 for nodes 8 and 10) to the home agent 26. This is shown by step S2 in FIG. 3. Using an appropriate conventional packet encapsulation protocol, the home agent 26 tunnels the communication content to the Old Foreign Agent 28, where it is received, unencapsulated, and delivered to the Old BSS 22 (e.g., via link layer addressing). The tunneling path from the home agent 26 to the Old Foreign Agent 28 is shown by the pathway labeled 30 in FIGS. 1 and 2. For return communications from the mobile wireless node 14 to the correspondent nodes, the home agent 26 is not used. Rather, normal routing occurs over the pathway labeled 32 between the Old Foreign Agent and either the gateway 12 (FIG. 1) or a correspondent node in the data network 6 (e.g., the node 11 in FIG. 2).

It is assumed now that the mobile wireless node 14 is traveling across a geographic area from the cell served by the Old BSS 22 to the cell served by the base station 24, which is identified in FIGS. 1 and 2 as the "New BSS." As this occurs, the process of hand-off negotiation is initiated in the mobile wireless system. This is shown by step S3 in FIG. 3. As is known in the art, this process typically includes negotiation by and between several base stations. During the handoff negotiation period, it is assumed that the New BSS 24 is selected as the new base station that will serve the mobile wireless node 14. It is further assumed that the New BSS 24 connects to the data network 6 via a different link than the Old BSS 22, and that a new foreign agent is warranted for the mobile wireless node 14. This new foreign agent is shown by reference numeral 34 in FIGS. 1 and 2, and is identified as the "New Foreign Agent." It is preferably identical in construction and function as the Old Foreign Agent 28, except that it maintains a link layer connection to the New BSS 24.

Following initiation of the handoff procedure, but prior to actual handoff of the mobile wireless node 14 to the New BSS 24, registration is invoked (by either the mobile wireless node 14 or the NEW BSS 24) to establish the address of the New Foreign Agent 34 as a new care-of address. This is shown by step S4 in FIG. 3. As is in the case of the initial registration procedure described above, the home agent 26 establishes a mobility binding between the mobile wireless node's home address and the new care-of address corresponding to the New Foreign Agent 34. However, unlike prior art systems, the home agent 26 does not immediately terminate (de-register) the old mobility binding between the mobile wireless node's home address and the old care-of address corresponding the Old Foreign Agent 28. Rather, the home agent 26 continues to maintain both mobility bindings. Moreover, it duplicates the communication content received from the correspondent nodes, such as the nodes 8, 10 and 11, and tunnels the communication content simultaneously to the Old Foreign Agent 28, via the pathway 30, and to the New Foreign Agent 34, via a new pathway labeled 36 in FIGS. 1 and 2. This is shown by step S5 in FIG. 3. Again, a separate pathway 38 is used to route return communication content, without using the home agent 26, between the New Foreign Agent 34 and either the gateway 12 (FIG. 1) or a data network correspondent node (e.g., the node 11 in FIG. 2).

When handoff of the mobile wireless node 14 actually occurs in the mobile wireless system, the communication content from the home agent 26 is immediately available at the New BSS 24. This is in contrast to prior art systems where the data network 6 must be aware of the air interface managed by the mobile wireless system, and needs to time the routing of communication content to the Old Foreign Agent 28, or to the New Foreign Agent 34, to coincide with the precise moment of handoff. In the telecommunication system 2, the data network 6 does not need to be concerned with the exact time of handoff. The communication content is provided to both the Old BSS 22 and the New BSS 24, where it can be transmitted no matter which of the two base stations is currently communicating with the mobile wireless node 14. This multi-route tunneling preferably continues for as long as necessary to ensure that the handoff procedure has completed. The Old Foreign Agent 28 is then deregistered by the home agent 26, and the home agent 26 reverts to single route tunneling. This is shown by steps S6 and S7 in FIG. 3.

Although FIGS. 1 and 2 illustrate a call handoff involving two base stations, some mobile systems, most notably those using CDMA encoding, may involve more than two base stations in a handoff negotiation. Because of the inherent flexibility of CDMA, a CDMA mobile node can communicate with multiple base stations simultaneously. This allows for the sampling of radio signal quality relative to multiple base stations, so that an informed decision can be made about which base station is the best one to accept the call handoff. It will be appreciated that the invention can be readily adapted to handle any number of base stations engaged in call handoff negotiation; namely, by adding a new foreign agent for each base station and routing the same communication content to all foreign agents (old and new) until the call handoff is completed.

The foregoing procedure can be advantageously implemented as a new mobile service protocol implemented in the data network 6. For example, the procedure described herein can be implemented as an enhancement to the IETF Mobile IP standards described by way of the Background set forth above, with the home agent 26 being programmed to perform communication content duplication and multi-route tunneling, and to implement registration and de-registration requests from the mobile wireless node 14 or the Old BSS 22 and New BSS 24.

Embodiments of the present invention can be used with known mobile wireless systems, such as analog and digital cellular telephone networks, and including TDMA and CDMA networks. However, because the handoff procedures for TDMA and CDMA systems vary, somewhat different implementations of the invention may be required in each case. For example, when a CDMA system implements handoff, a condition may occur where the Old BSS 22 and the New BSS 24 simultaneously receive the same communication content from the mobile wireless node 14. This communication content will then be duplicately routed over the return pathways 32 and 38 to either the gateway 12 (FIG. 1) or to a correspondent node in the data network 6 (e.g., the node 11 in FIG. 2). If additional foreign agents are involved, as may occur in a CDMA system, additional duplication of communication content would result. To accommodate this situation, the packet processing software in the gateway 12, or in the node 11, can be programmed to selectively discard the duplicate communication content packets. By way of example only, packets arriving on the pathways 32 and 38 (and possibly additional pathways) could be processed on a first-come/first-served basis. For each duplicated packet arriving on multiple pathways, the first packet arriving on any pathway could be processed and later arriving duplicate packets could be discarded. Alternatively, packet selection could be based on some measurable indication of quality.

Accordingly, a system and method for seamless data network communication service during mobile wireless call handoff has been described. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a data network providing wireless telecommunication service to a mobile wireless node therein by way of addressable communication packets containing customer communication content ("packetized communication content"), the data network being linked to at least two base stations for communicating with the mobile wireless node when it is located in geographic areas respectively served by the base stations, said data network further including a network routing node assigned to said mobile wireless node and serving as a home agent located in a home subnetwork of said mobile wireless node, said home agent being configured to intercept packetized communication content addressed to a home data network address permanently assigned to said mobile wireless node and to tunnel said packetized communication content to a temporary care-of data network address registered on behalf of said mobile wireless node, a method for providing seamless data network telecommunication service to the mobile wireless node during a mobile wireless call handoff procedure resulting in the mobile wireless node being handed off from a first one of the base stations to second one of the base stations, comprising the steps of:

- prior to initiation of said call handoff procedure, controlling said home agent to route said packetized communication content on behalf of said mobile wireless node to a first care-of data network address for delivery to said mobile wireless node via said first base station;
- following initiation of said call handoff procedure, notifying said home agent of said call handoff procedure and a second care-of data network address;
- controlling said home agent to route said packetized communication content on behalf of said mobile wireless node to said second care-of data network address for delivery to said mobile wireless node via said second base station, while continuing to route the same packetized communication content to said first care-of data network address for delivery to said mobile wireless node via said first base station; and
- upon completion of said call handoff procedure, controlling said home agent to terminate the routing of said packetized communication content on behalf of said mobile wireless node to said first care-of data network address.

2. A method in accordance with claim 1 wherein said packetized communication content is routed to intermediate routing nodes that are respectively linked to said first and second base stations and respectively associated with said first and second care-of data network addresses.

3. A method in accordance with claim 1 wherein each of said first and second care-of data network addresses corresponds to a foreign agent routing node in said data network that links to one or more base stations.

4. A method in accordance with claim 1 further including a first registration step wherein, upon said mobile wireless node initiating wireless communication with said first base station, said mobile wireless node is registered at said home agent to receive said packetized communication content via said first care-of data network address.

5. A method in accordance with claim 4 further including a second registration step wherein, following initiation of said call handoff procedure, said mobile wireless node is registered at said home agent to receive said packetized communication content via said second care-of data network address.

6. A method in accordance with claim 5 further including a de-registration step wherein, upon said call handoff procedure completing, said mobile wireless node is de-registered at said home agent from receiving said packetized communication content via said first care-of data network address.

7. A method in accordance with claim 1 wherein said mobile wireless node communicates with a correspondent node in said data network or in another network, wherein said packetized communication content sent from said correspondent node is routed through said home agent to one or both of said first and second care-of data network addresses, and wherein said packetized communication content sent from said mobile wireless node is routed through one or both of said first and second care-of data network addresses to said correspondent node while bypassing said home agent.

8. In a data network providing wireless telecommunication service to a mobile wireless node therein by way of addressable communication packets containing customer communication content ("packetized communication content"), the data network being linked to at least two base stations for communicating with the mobile wireless node when it is located in geographic areas respectively served by the base stations, a system for providing seamless telecommunication service on behalf of the mobile wireless node during a mobile wireless call handoff procedure resulting in the mobile wireless node being handed off from a first base station to a second base station in the data network, comprising:

- a network routing node assigned to said mobile wireless node, said network routing node being a home agent located in a home subnetwork of said mobile wireless node, said home agent being configured to intercept packetized communication content addressed to a home data network address permanently assigned to said mobile wireless node and to tunnel said packetized communication content to a temporary care-of data network address registered on behalf of said mobile wireless node;
- means in said home agent, implemented prior to initiation of said call handoff procedure, for routing said packetized communication content on behalf of said mobile wireless node to a first care-of data network address for delivery to said mobile wireless node via said first base station;
- means in said home agent, implemented following initiation of said call handoff procedure, for receiving a notification of said call handoff procedure and a second care-of data network address;
- means in said home agent, implemented following initiation of said call handoff procedure, for routing said packetized communication content on behalf of said mobile wireless node to a second care-of data network address for delivery to said mobile wireless node via said second base station, while continuing to route the same packetized communication content to said first care-of data network address; and
- means in said home agent, implemented upon completion of said call handoff procedure, for terminating the routing of packetized communication content on behalf of said mobile wireless node to said first care-of data network address.

9. A system in accordance with claim 8 wherein said packetized communication content is routed to intermediate routing nodes that are respectively linked to said first and second base stations and respectively associated with said first and second care-of data network addresses.

10. A system in accordance with claim 8 wherein each of said first and second care-of data network addresses corresponds to a foreign agent routing node in said data network that links to one or more base stations.

11. A system in accordance with claim 8 further including first registration means in said home agent, responsive to said mobile wireless node initiating wireless communication with said first base station, for registering said mobile wireless node to receive said packetized communication content via said first care-of data network address.

12. A system in accordance with claim 11 further including second registration means in said home agent, responsive to initiation of said call handoff procedure, for registering said mobile wireless node to receive said packetized communication content via said second care-of data network address.

13. A system in accordance with claim 12 further including de-registration means in said home agent, responsive to said call handoff procedure completing, for de-registering said mobile wireless node from receiving said packetized communication content via said first care-of data network address.

14. A system in accordance with claim 8, wherein said mobile wireless node communicates with a correspondent node in said data network or in another network, wherein said packetized communication content sent from said correspondent node is routed through said home agent to one or both of said first and second care-of data network addresses, and wherein said packetized communication content sent from said mobile wireless node is routed through one or both of said first and second care-of data network addresses to said correspondent node while bypassing said home agent.

15. A data network-implemented wireless telecommunication system with improved service provision of addressable communication packets containing customer communication content ("packetized communication content") to mobile wireless communication devices during call handoff, comprising:

a first base station configured to communicate with mobile wireless communication devices located in a first geographic area served by said first base station;

a second base station configured to communicate with mobile wireless communication devices located in a second geographic area served by a second first base station;

a first data network node for delivering packetized communication content to a mobile wireless communication device when it is located in said first geographic area;

a second data network node for delivering packetized communication content to said mobile wireless communication device when it is located in said second geographic area;

a third data network node serving as a home agent located in a home subnetwork of said mobile wireless communication device for routing packetized communication content from a correspondent node attempting to communicate with said mobile wireless communication device using a home data network address permanently assigned to said mobile wireless communication device to temporary first and second care-of data network addresses respectively associated with said first and second data network nodes;

first means in said third node for routing said packetized communication content to said first node when said mobile wireless communication device is in said first geographic area;

second means in said third node responsive to said first base station initiating a procedure to handoff said mobile wireless communication to said second base station as said mobile wireless communication device travels from said first geographic area to said second geographic area, for routing said packetized communication content to said second node while continuing to route the same packetized communication content to said first node; and third means in said third node responsive to the completion of said procedure for handing off said mobile wireless communication device to said second base station, for discontinuing the routing of said packetized communication content to said first routing node.

* * * * *